US007764604B2

United States Patent
Kye

(10) Patent No.: US 7,764,604 B2
(45) Date of Patent: Jul. 27, 2010

(54) METHOD OF CONTROLLING MACS BETWEEN CABLE MODEM TERMINATION SYSTEM AND CABLE MODEM

(75) Inventor: Hwan Won Kye, Seoul (KR)

(73) Assignee: LG Electronics, Inc., Seoul (KR)

( * ) Notice: Subject to any disclaimer, the term of this patent is extended or adjusted under 35 U.S.C. 154(b) by 2371 days.

(21) Appl. No.: 10/305,077

(22) Filed: Nov. 27, 2002

(65) Prior Publication Data

US 2003/0101464 A1 May 29, 2003

(30) Foreign Application Priority Data

Nov. 28, 2001 (KR) .................. 10-2001-0074672

(51) Int. Cl.
*H04L 12/26* (2006.01)
(52) U.S. Cl. ............... 370/230; 370/468; 709/223; 725/111
(58) Field of Classification Search ......... 370/229–236, 370/468, 345, 490, 493; 709/223–226; 725/111; 375/222

See application file for complete search history.

(56) References Cited

U.S. PATENT DOCUMENTS

| 6,453,472 B1 * | 9/2002 | Leano et al. ................. 725/111 |
| 6,807,193 B1 * | 10/2004 | Beser ......................... 370/498 |
| 6,847,635 B1 * | 1/2005 | Beser ......................... 370/352 |
| 6,950,399 B1 * | 9/2005 | Bushmitch et al. .......... 370/236 |
| 7,072,312 B2 * | 7/2006 | Zeira et al. .................. 370/321 |
| 7,145,887 B1 * | 12/2006 | Akgun et al. ............... 370/321 |
| 7,496,110 B1 * | 2/2009 | Beser ......................... 370/458 |
| 2002/0126699 A1 * | 9/2002 | Cloonan et al. ............. 370/468 |
| 2002/0141585 A1 * | 10/2002 | Carr ............................. 380/255 |

\* cited by examiner

*Primary Examiner*—Ricky Ngo
*Assistant Examiner*—Gary Mui
(74) *Attorney, Agent, or Firm*—Harness, Dickey & Pierce, P.L.C.

(57) ABSTRACT

Disclosed is a method of controlling MACs between a cable modem termination system (CMTS) supporting variable length packet transmission and a cable modem (CM). The present invention switches a scheduling type a specific service session of an inactive state only, thereby enabling to minimize waste of bandwidth according to switching collectively a scheduling type of a plurality of service sessions sharing a single physical channel when the scheduling type is requested to switch.

24 Claims, 6 Drawing Sheets

| EH_TYPE | EH_LEN | EH_VALVE |
|---------|--------|----------|
| 7 | 2 | Switch UGS type to UGS/AD type |
| 8 | 2 | Switch UGS/AD type to UGS type |
| 9 | 2 | Return to a prior type |

(UGS ↔ UGS/AD)

METHOD OF CONTROLLING MACS BETWEEN CABLE MODEM TERMINATION SYSTEM AND CABLE MODEM

This application claims the benefit of the Korean Application No. P2001-74672 filed on Nov. 28, 2001, which is hereby incorporated by reference.

BACKGROUND OF THE INVENTION

1. Field of the Invention

The present invention relates to a cable network, and more particularly, to a method of controlling MACs between a cable modem termination system (CMTS) supporting variable length packet transmission and a cable modem (CM).

2. Discussion of the Related Art

Generally, a cable network is implemented by a packet data communication system supporting various services with very high speed.

A transmission path over the cable network is realized by a cable modem termination system (hereinafter abbreviated CMTS) and a cable modem (hereinafter abbreviated CM). Namely, CMTS and CM construct the cable network.

CMTS includes a network terminator for interfacing an external network (e.g. backbone network) distributed on an enormous area as well as a modulator/demodulator for an interface between upstream and downstream.

Streams of CMTS and CM are exchanged through a radio frequency (RF) interface.

CMs are connected to a plurality of customer premise equipments (CPEs) to realize a single local distribution network.

The cable network provides a customer with unidirectional and bi-directional services (e.g. cable broadcasting service, packet telephony service, video conferencing service, and services over Internet protocol) supported by the external backbone network For instance, a structure of a cable network providing Internet protocol based services is shown in FIG. 1.

The cable network structure in FIG. 1 is based on DOCSIS (data over cable service interface specification).

Specifically, DOCSIS proposes a scheduling for securing quality of service (QoS) of VoIP (voice over Internet protocol) The scheduling is defined by a MAC (media access control) sub-layer as a sub-layer of a link layer among protocol layers of DOCSIS, and is an operation for allocating available resources effectively. Specifically, the scheduling is performed to share a plurality of service sessions for a single QoS. In aspect of a physical layer, the scheduling is performed to multiplex a plurality of service data with a single physical channel.

There is a UGS (unsolicited grant service) type or a UGS/AD (unsolicited grant service with activity detection) type as a scheduling type for supporting a real-time service flow generating variable-length packet data.

The UGS type occupies a bi-directional time slot regardless of an active state transmitting valid voice packets or an inactive state transmitting invalid voice packets.

On the other hand, the UGS/AD type occupies the bi-directional slots in an active state but occupies the time slots required for transmitting the valid voice packets only in an inactive state by monitoring periodically a count of time slots to transmit the valid voice packets.

The scheduling proposed by DOCSIS of the related art selects to use one of the two scheduling types, and alters to use the selected scheduling type to save the occupied bandwidth in case.

However, the alteration of the scheduling type according to the related art is applied to a plurality of the entire service sessions sharing the single physical channel. Namely, the UGS type is used for a plurality of the service sessions sharing the single physical channel. If allocation of the time slots are requested, as a new session is added while there is no time slot to allocate currently, the scheduling type of all the service sessions sharing the single physical channel is switched from the UGS type to the UGS/AD type to allocate the time slot, which is allocated for the transmission of the invalid voice packets, for the new session. Hence, the scheduling type (ex. UGS type) of a plurality of the service sessions sharing the single physical channel is collectively switched into the UGS/AD type. In other words, it is impossible to switch the scheduling type individually for the service sessions sharing the single physical channel.

After all, the switch of the scheduling type proposed for the purpose of avoiding waste of the occupied bandwidth has no effect occasionally.

SUMMARY OF THE INVENTION

Accordingly, the present invention is directed to a method of controlling MACs between a cable modem termination system (CMTS) and a cable modem (CM) that substantially obviates one or more problems due to limitations and disadvantages of the related art.

An object of the present invention is to provide a method of controlling MACs between a cable modem termination system (CMTS) and a cable modem (CM) enabling to minimize waste of bandwidth according to switching collectively a scheduling type of a plurality of service sessions sharing a single physical channel when the scheduling type is requested to switch.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling MACs (media access controls) between a cable modem termination system (CMTS) and a cable modem (CM) according to the present invention includes a first step of monitoring a scheduling state of a plurality of service sessions sharing a physical channel between the CMTS and CM and a second step of switching a scheduling type of a specific session occupying the physical channel inactively among a plurality of the service sessions sharing the physical channel.

Preferably, the CMTS further monitors a current scheduling type of a plurality of the service sessions sharing the physical channel, whether at least one additional service session to share the physical channel is added or not, and whether a time slot to be allocated to the additional service session to share the physical channel exists or not in the first step.

Preferably, the second step includes a step (a) of, when a time slot to be allocated to at least one additional service session added to share the physical channel is not available, having the CMTS insert a switch command of the scheduling type of the specific service session occupying the physical channel inactively in a MAC frame format to transmit to the CM and a step (b) of having the CM switch the scheduling type of the specific service session occupying the physical channel in accordance with the switch command inserted in the MAC frame format.

More preferably, the step (a) includes the steps of inserting the switch command of the scheduling type in an extended header field of a MAC header constructing the MAC frame format of the specific service session occupying the physical channel inactively, inserting a source address and a destination address for distinguishing the specific service session, of which scheduling type will be switched, in a user data field (User Data) of a payload data unit (PDU) constructing the MAC frame format, and encoding the MAC frame format of the specific service session, of which scheduling type will be switched, to transmit to the CM.

More preferably, the switch command of the scheduling type is inserted in a reserved area of the extended header field by the step of inserting the switch command of the scheduling type.

In another aspect of the present invention, in controlling MACs (media access controls) between a cable modem termination system (CMTS) and a cable modem (CM) supporting a voice over internet protocol (VoIP) service, a method of controlling the MACs (media access controls) between the cable modem termination system (CMTS) and the cable modem (CM) includes a first step of having the CMTS monitor a scheduling state of a plurality of IPs sharing a physical channel between the CMTS and CM and a second step of having the CM switch a scheduling type of the IP occupying a time slot inactively among a plurality of the IPs.

Preferably, in the first step, the CMTS monitors the current scheduling type of the prior IPs sharing the physical channel, whether a new IP to share the physical channel exists, and whether a time slot to be allocated to the new IP exists.

Preferably, the second step includes an step (a) of, when the time slot to be allocated to at least one additional IP added to share the physical channel is not available, having the CMTS insert a switch command of the scheduling type of the specific IP of an inactive state in a MAC frame format transmitted to the IP of the inactive state to transmit to the CM and a step (b) of having the CM switch the scheduling type of the specific IP of the inactive state in accordance with the switch command inserted in the MAC frame format.

In a further aspect of the present invention, in controlling MACs (media access controls) between a cable modem termination system (CMTS) and a cable, modem (CM) supporting variable-length packet transmission, a method of controlling the MACs (media access controls) between the cable modem termination system (CMTS) and the cable modem (CM) includes a first step of having the CMTS monitor a time slot occupying state of a plurality of service sessions sharing a physical channel formed between the CMTS and CM for the variable-length packet transmission, a second step of, as an additional service session to share the physical channel is added, having the CMTS command the CM to switch a scheduling type of a specific service session occupying the time slot inactively among a plurality of the service sessions sharing the physical channel, and a third step of having the CM switch the current scheduling type of the specific service session occupying the time slot inactively to another scheduling type.

Preferably, in order for the CMTS to switch the prior scheduling type for the specific service session occupying the time slot inactively, a switch command of the scheduling type, IP addresses of the service session expecting a switch of the scheduling type, and parameters required for the switch of the scheduling type are inserted in a MAC frame format of the specific service session occupying the time slot inactively to transmit to the CM.

More preferably, by comparing a currently operating prior scheduling type and a switch-expecting new scheduling type to each other, parameters, which are different from parameters used for the, prior scheduling type and are used for the new scheduling type, are further inserted in a user data field (User Data) constructing a payload data unit (PDU) of the MAC frame format.

More preferably, the switch command of the scheduling type having a form of type/length/value (TYPE/LEN/VALUE) is inserted in an extended header field of the MAC frame format of the service session having the scheduling type to be switched.

More preferably, in order to switch the scheduling type by each of the service sessions, a destination IP address and a source IP address of the service session having the scheduling type to be switched are inserted in a user data field (User Data) constructing a payload data unit (PDU) of the MAC frame format of the service session having the scheduling type to be switched.

Preferably, the scheduling type is switched between a UGS (unsolicited grant service) type allocating the time slot to the service sessions sharing the physical channel regardless of whether to occupy the time slot or not and a UGS/AD (unsolicited grant service with activity detection) type suppressing the time slot allocated to the specific service session occupying the time slot inactively among a plurality of the service sessions sharing the physical channel to allocate to another service session.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A method of controlling MACs between a cable modem termination system (CMTS) and a cable modem (CM)

according to the present invention is intended to control a scheduling of VoIP for real-time transmission of variable-length packet data.

Figure 1:
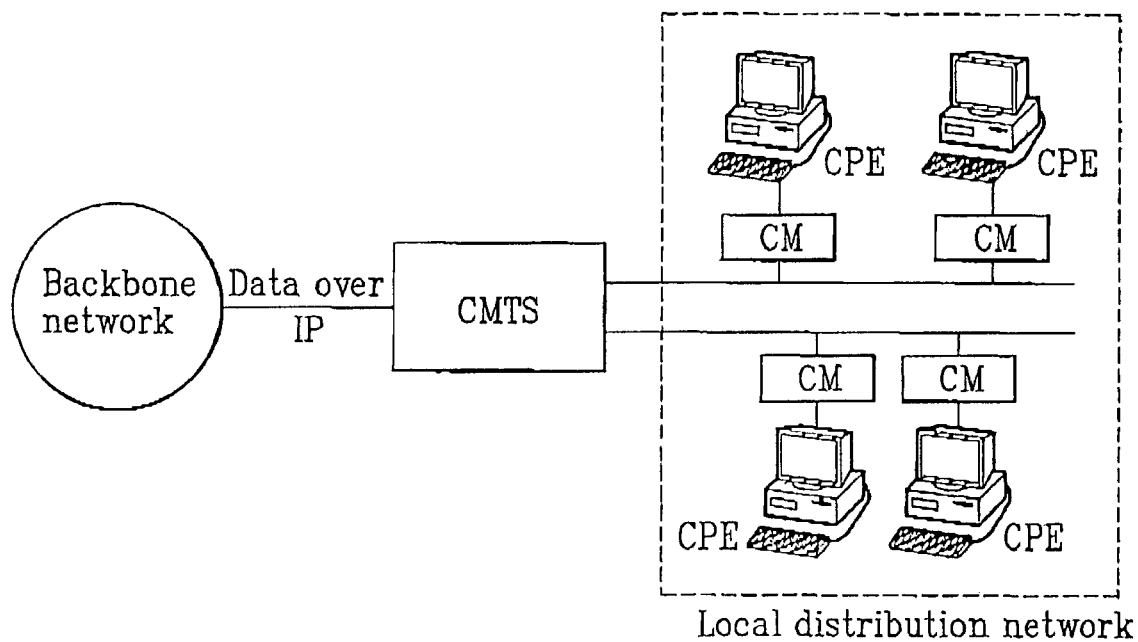
FIG. 1 illustrates a structure of a general cable network providing Internet protocol based services.
Figure 2:
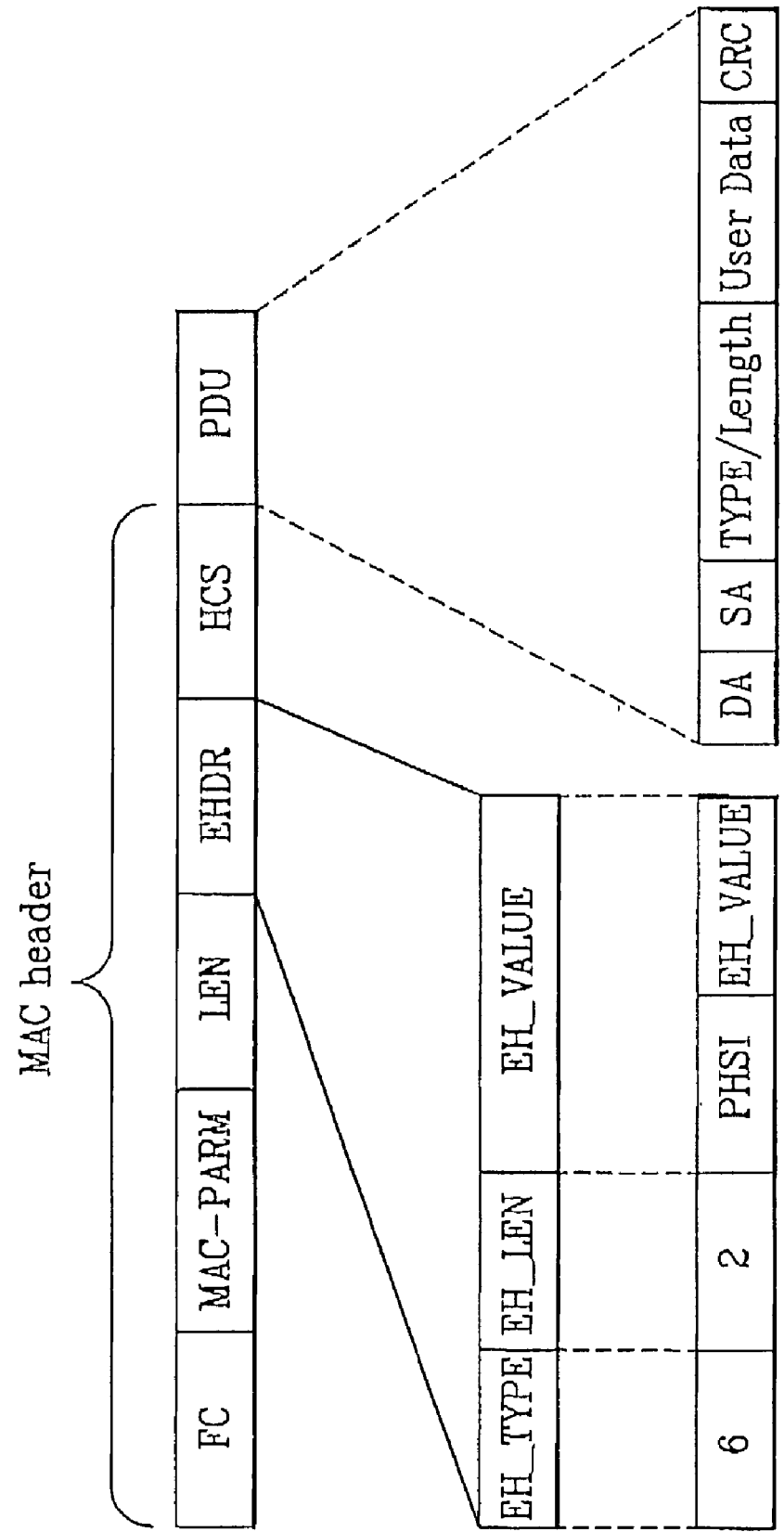
FIG. 2 illustrates a diagram of a structure of a MAC frame format according to DOCSIS.

FIG. 2 illustrates a diagram of a structure of a MAC frame format according to DOCSIS.

Referring to FIG. 2, a MAC frame format is mainly divided into a MAC header and a payload data unit (PDU).

The MAC header includes a frame control field FC identifying a type of the MAC header, a parameter field MAC_PARM used in accordance with a frame control (FC), a length field LEN representing a length of a MAC frame, an extended header field EHDR having a variable length, and a MAC header check sequence field HCS (header check sequence) for checking an error of the MAC header.

The frame control field FC includes a control type flag FC_TYPE for representing a MAC frame control type, a parameter flag FC_PARM used in accordance with the MAC frame control type (FC_TYPE), and a flag EHDR_ON for representing whether the extended header field EHDR exists or not. For instance of the control type flag FC_TYPE, when 2 bits are used as the control type flag, "00" indicates a packet PDU MAC header, "01" indicates an ATM PDU MAC header, "10" indicates a reserved PDU MAC header, and "11" indicates a MAC specific header.

Relating to the extended header field, the parameter flag MAC_PARM is for determining a length of EHDR and must be set to zero if EHDR fails to exist.

Whether the extended header field EHDR exists or not, as mentioned in the foregoing description, is displayed by the flag EHDR_ON. If EHDR exists as the flag EHDR_ON has a valid value, a length of EHDR is marked on the parameter field MAC_PARM.

The extended header field is constructed to have a TLV (TYPE/LENGTH/VALUE) structure including at least one or more element fields. Namely, the element fields include an EH_TYPE field, an EH_LEN field, and an EH_VALUE field. The EH_TYPE field represents a type of an extended header (EH) element, the EH_LEN field represents a length of the extended header element, and the EH_VALUE field is for inserting a data value of the extended header element.

Specifically, the present invention represents the scheduling system through the extended header field EHDR. More specifically, the scheduling type is marked on the respective element fields (EH_TYPE, EH_LEN, and EH_VALUE fields) as the form of TLV (TYPE/LENGTH/VALUE). And, a command value of the scheduling type is inserted in the EH_VALUE field. Besides, the present invention uses a reserved area of the extended header field for a switch command of the scheduling type.

The payload data unit PDU includes a destination address field DA representing a destination address, a source address field SA representing a source address, a field TYPE/Length for representing a type of a local distribution network (e.g. Ethernet) or a specific length, a user data field User Data having a user data inserted therein, and a cyclic redundancy check field CRC for checking a transmission error of the MAC frame. Since the present invention relates to the scheduling of VoIP, a voice data having a variable length is inserted in the user data field User Data, and a parameter for controlling MACs and an address of a target of which scheduling type will be switched are further inserted in the user data.

In the present invention, the MAC frame format is used for transmitting a command for switching a scheduling type for a specific service session.

Figure 5A:
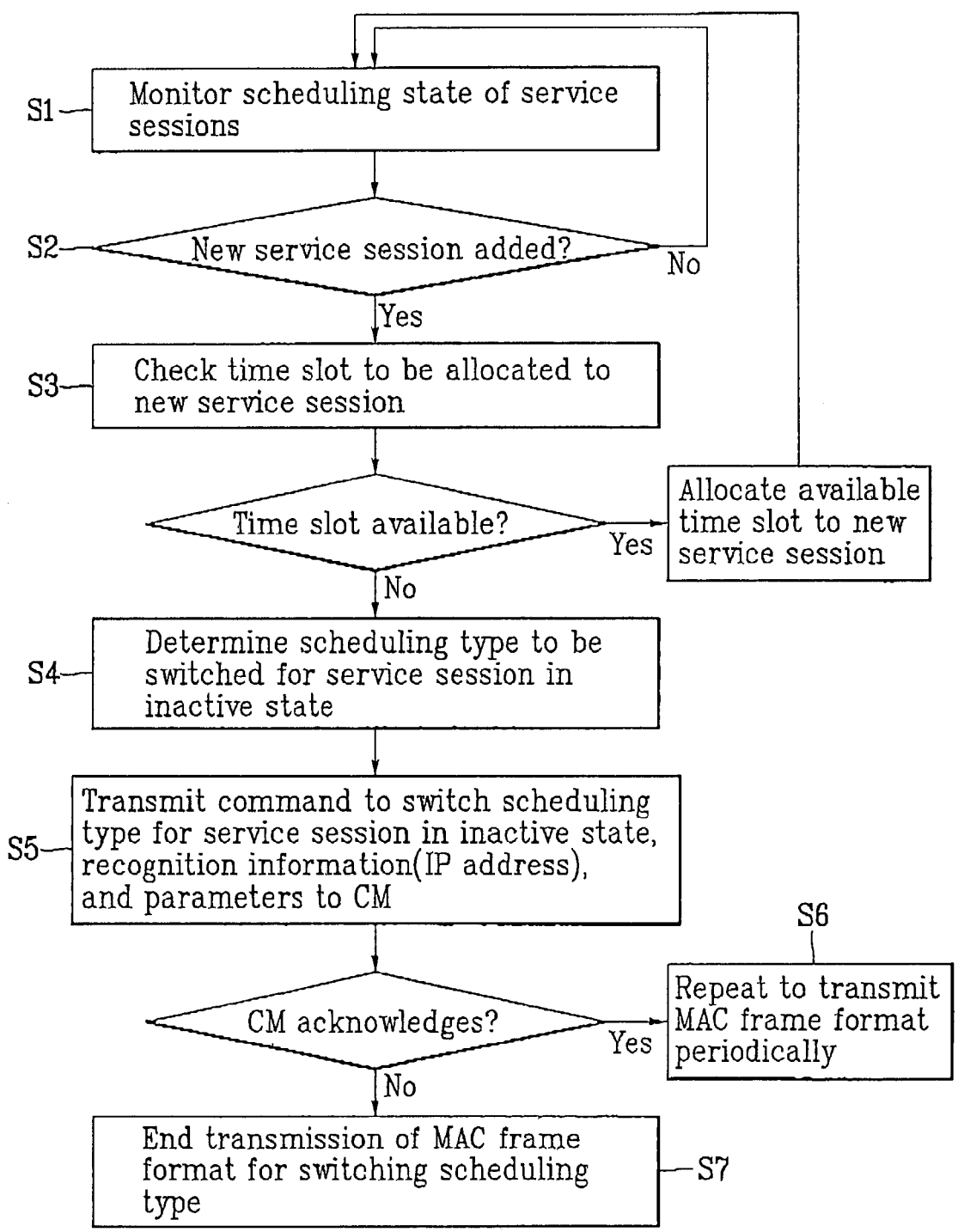
FIG. 5 illustrates a flowchart of a scheduling switch procedure by a method of controlling MACs between CMTS and CM according to the present invention.
Figure 5B:
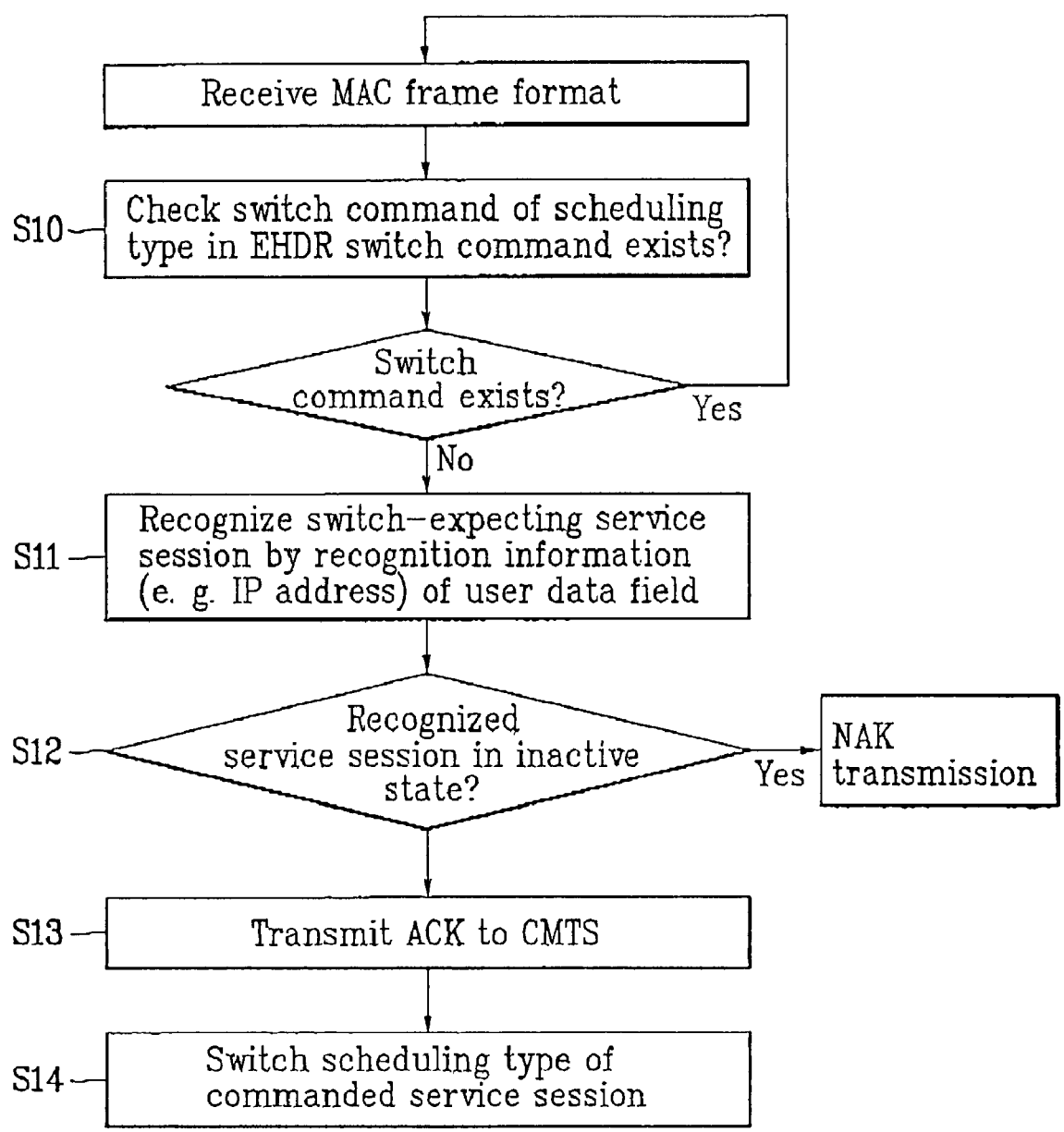

FIG. 5 illustrates a flowchart of a scheduling switch procedure by a method of controlling MACs between a cable modem termination system (CMTS) and a cable modem (CM) according to the present invention, FIG. 5A is for controlling MACs of the CMTS and FIG. 5B is for controlling MACs of the CM.

First of all, a plurality of physical channels are formed between the CMTS and CM for the VoIP service transmitting variable-length packets. And, various service sessions share the respective physical channels. As the various service sessions share a single physical channel, various VoIP voice packets are multiplexed to transmit through the single physical channel.

Referring to FIG. 5A, the CMTS monitors scheduling conditions of the various service sessions sharing the single physical channel formed for the VoIP service (S1). More specifically, the CMTS periodically monitors the scheduling type applied currently to the service sessions sharing the physical channel. The CMTS periodically monitors whether a new service session to share the current physical channel is added or not thereafter. Moreover, the CMTS periodically monitors whether a time slot to be allocated to the added new service session is available or not. Besides, the CMTS monitors a time slot occupying state of the service sessions sharing the physical channel.

Once it is monitored that a single new service session to share the physical channel thereafter is added (S2), the CMTS checks whether the time slot to be allocated to the new service session is available or not (S3). In this case, if the time slot to be allocated to the new service session is not available, a scheduling switch process for switching the scheduling type of the previously monitored service sessions to another scheduling type. Specifically, the present invention initiates the scheduling switch process just for the service session occupying the channel inactively among the prior service sessions sharing the physical channel.

In the scheduling switch process, the CMTS initially selects the service session of which scheduling type will be switched on the basis of the information monitored in the above-explained step, and then determines the scheduling type that will be switched suitably for the selected service session (S4). In this case, the inactive-stated service session occupying the physical channel inactively to transmit the invalid voice packets is selected as the service session of which scheduling type will be switched.

Thereafter, the CMTS inserts the switch command of the scheduling type for the inactive-stated service session in the MAC frame format of the inactive-stated service session to transmit to the CM (S5). Moreover, the CMTS further inserts a recognition information (e.g. IP address) of the service session to be switched and parameters for switching the scheduling in the MAC frame format to transmit to the CM.

For instance, if the prior scheduling type of the prior service sessions sharing the physical channel is set to the UGS type and if the time slot to be allocated additionally is not available, all the available time slots of the physical channel are occupied by the prior service sessions. When a bandwidth of the physical channel is saturated, if the new service session requests allocation of the time slot, the CMTS is unable to allocate a new time slot to the new service session. Hence, the CMTS inserts a command for switching the scheduling type of a specific one of the prior service sessions sharing the physical channel into the UGS/AD type in the MAC frame format of the service session to be switched to transmit to the CM.

Figures 3, 4:
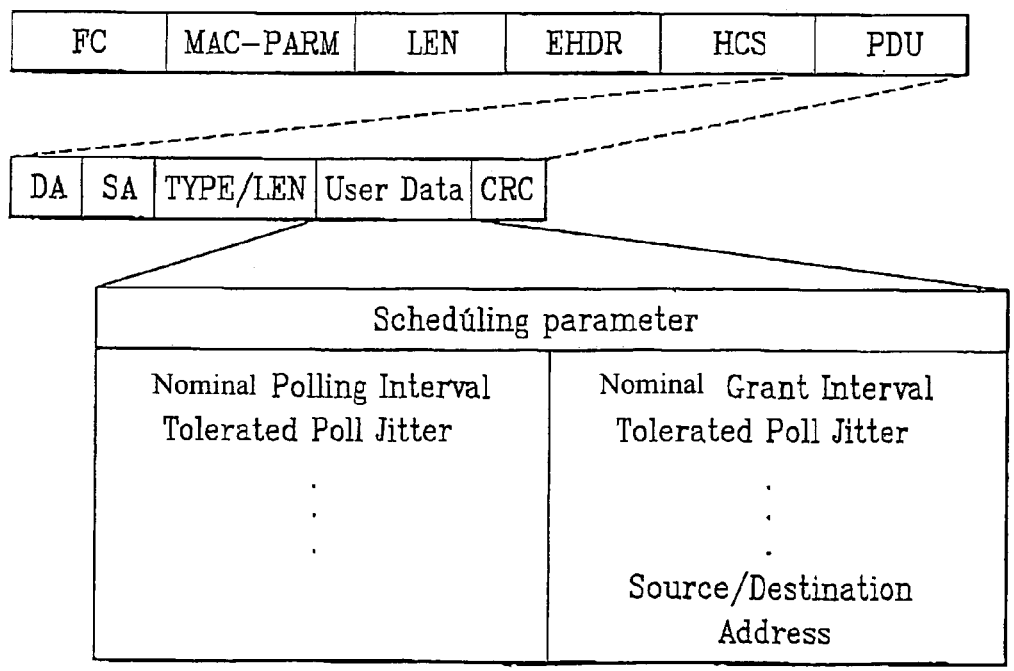
FIG. 3 illustrates a diagram of an extended header format applied to a method of controlling MACs according to the present invention.
FIG. 4 illustrates a diagram of a user data field structure of a payload data unit in a MAC frame format according to the present invention.

The MAC frame format used for transmitting the switch command of the scheduling type according to the present invention is shown in FIG. 3 and FIG. 4. Namely, FIG. 3 illustrates a diagram of an extended header format applied to a method of controlling MACs according to the present invention and FIG. 4 illustrates a diagram of a structure of a user data field User Data of a payload data unit in a MAC frame format according to the present invention.

First of all, the following prerequisites should be preceded in order to transmit the switch command of the scheduling type according to the present invention to the CM.

First, the flag EHDR_ON, which indicates whether the extended header field EHDR exists in the frame control field FC of the MAC header or not, has a valid value.

Second, a corresponding length value is marked on the parameter field MAC_PARM of the MAC header determining the length of the extended header field EHDR.

After the prerequisites are carried out, the switch command for the inactive-stated service session is transmitted through the extended header field of the MAC header in the present invention. And, the recognition information (i.e. IP address) of the service session to be switched and the parameters for the switch are transmitted through the user data, field User Data of the payload data unit.

A method of inserting the switch command for the service session in the extended header field is explained by referring to FIG. 3 as follows.

The switch command for the service session is inserted in the reserved area of the extended header field EHDR. More specifically, a reserved type among various types of the extended header field EHDR is used to represent the switch command for the service session. The reserved type is one of seventh to ninth types among sixteen types EH-TYPE of the extended header (EH) element. Hence, the command for switching the USG type of the scheduled service session to the UGS/AD type is represented by one of the seventh to ninth types of the extended header field EHDR. A length of the type representing the switch command is defined in the EH_LEN field and the corresponding command value is marked on the EH_VALUE field. In brief, one switch command for one service session having the form of TLV (TYPE/LENGTH/VALUE) is inserted in the extended header field.

Additionally, since the bandwidth of the physical channel is saturated, the command for switching the UGS type to the UGS/AD type is inserted in the extended header field EHDR to transmit to the CM. However, in case that the degree that the service sessions sharing the physical channel occupy the time slots is mitigated, the command for switching the scheduling type of the service session having switched to the UGS/AD type back to the UGS type is inserted in the extended header field EHDR to transmit to the CM. Namely, the command for returning the service session, of which scheduling type has been switched to the UGS/AD type, to the UGS type is represented by one of the seventh to ninth types of the extended header field EHDR. A length of the type representing the switch command is defined in the EH_LEN field, and a corresponding return command value is marked on the EH_VALUE field.

Therefore, for the service sessions sharing the physical channel, the switch of the scheduling type according to the present invention enables to implement both of the first case that the UGS type allocating the time slots regardless of the time slot occupying state is switched to the UGS/AD type by suppressing to allocate the invalid time slot allocated to the inactive-stated service session among the service sessions sharing the physical channel to another service session and the second case opposite to the first case. And, the rest types of the extended header field are used as options to return the previously switched scheduling type to the prior scheduling type.

Specifically in the extended header field shown in FIG. 3, the seventh type is used for switching the scheduling from the UGS type to the UGE/AD type and the eighth type is used for switching the scheduling from the UGS/AD type to the UGS type. And, the ninth type is used as an option for returning the switched scheduling type to the prior scheduling type. Besides, such a use of the extended header field can be modified variously.

Referring to FIG. 4, regarding the forms of the recognition information of the service session of which scheduling type will be switched and the parameters for the switching, as the specific service session of which scheduling type will be switched is determined in more detail, a source address and a destination address for distinguishing the service session, of which scheduling type will be switched, from other service sessions are inserted in the user data field. For additional instance, the present invention can use PHSI (payload header suppression index) having header information of the VoIp service sessions to distinguish the service session of which scheduling type will be switched from other service sessions.

Moreover, a scheduling parameter to be used for switching the scheduling type of the service session having determined the switch of the CM is further inserted in the user data field. In this case, the prior scheduling type operating currently is compared to the other scheduling type that will be switched later and parameters different from those used in the currently operating prior scheduling type are further inserted. Namely, the parameters failing to be used in the prior scheduling types among the parameters used in the scheduling type that will be switched are further added.

FIG. 4 shows that the parameters used in the prior scheduling type (UGS type) and the parameters used in the scheduling type that will be switched are inserted in the user data field.

For instance, the scheduling parameters required for the UGS type as the scheduling type includes "Nominal Grant Interval" representing a periodical time interval of the MAC frame for the VoIP service and "Tolerated Grant Jitter" representing an arrival time allowing deviation of the MAC frame for the VoIP service. If the prior scheduling type is set to the UGS type and the scheduling type to be switched is the UGS/AD type, "Nominal Polling Interval" for representing a polling interval and "Tolerated Poll Jitter" for representing a polling delay allowing range, which are the scheduling parameters required for the UGS/AD type, are just inserted in the user data field USER DATA of the MAC frame of the service session to be switched.

The CMTS periodically repeats to transmit the MAC frame of the service session in which the switch command of the scheduling type for the service session is inserted until an affirmative acknowledgement ACK is received from the CM. (S6, S7).

Referring to FIG. 5B, the CM, which has received the MAC frame format of the service session of which scheduling type will be switched from the CMTS, judges whether the scheduling type for the designated service session can be switched or not based on the information inserted in the received MAC frame format. Namely, the CM checks whether the switch command of the scheduling type exists in the extended header field EHDR of the MAC frame format (S10). If the switch command of the scheduling type exists in the extended header field EHDR of the MAC frame format, the CM recognizes the service session to be switched with the recognition information (e.g. IP address) inserted in the user data field of the MAC frame format (S11). And, the CM checks whether the recognized service session occupies the time slot inactively or not (S12).

If it is judged that the scheduling type can be switched since the commanded service session is in the inactive state, the CM transmits such an affirmative response to the CMTS that the scheduling type of the commanded service session can be switched (S13). And, the CM switches the scheduling type of the commanded service session using the scheduling parameters inserted in the user data field of the received MAC frame format (S14)

Therefore, when there is no margin of the sources (e.g. time slot) allocated to the service sessions sharing the single physical channel, controlling MACs is carried out to have the service sessions operate in another scheduling type.

The procedure of switching the scheduling type of the specific one of the service sessions sharing the single physical channel is explained so far. Yet, at least one or more of the service sessions sharing the single physical channel can become a switch target.

Moreover, the above-explanation has the same meaning of the switch of the scheduling type for IPs sharing a single physical channel formed between CMTS and CM. Hence, the switch of the scheduling type for a specific one of IPs sharing the single physical channel has the same procedures shown in FIG. 5A and FIG. 5B.

Figure 6:
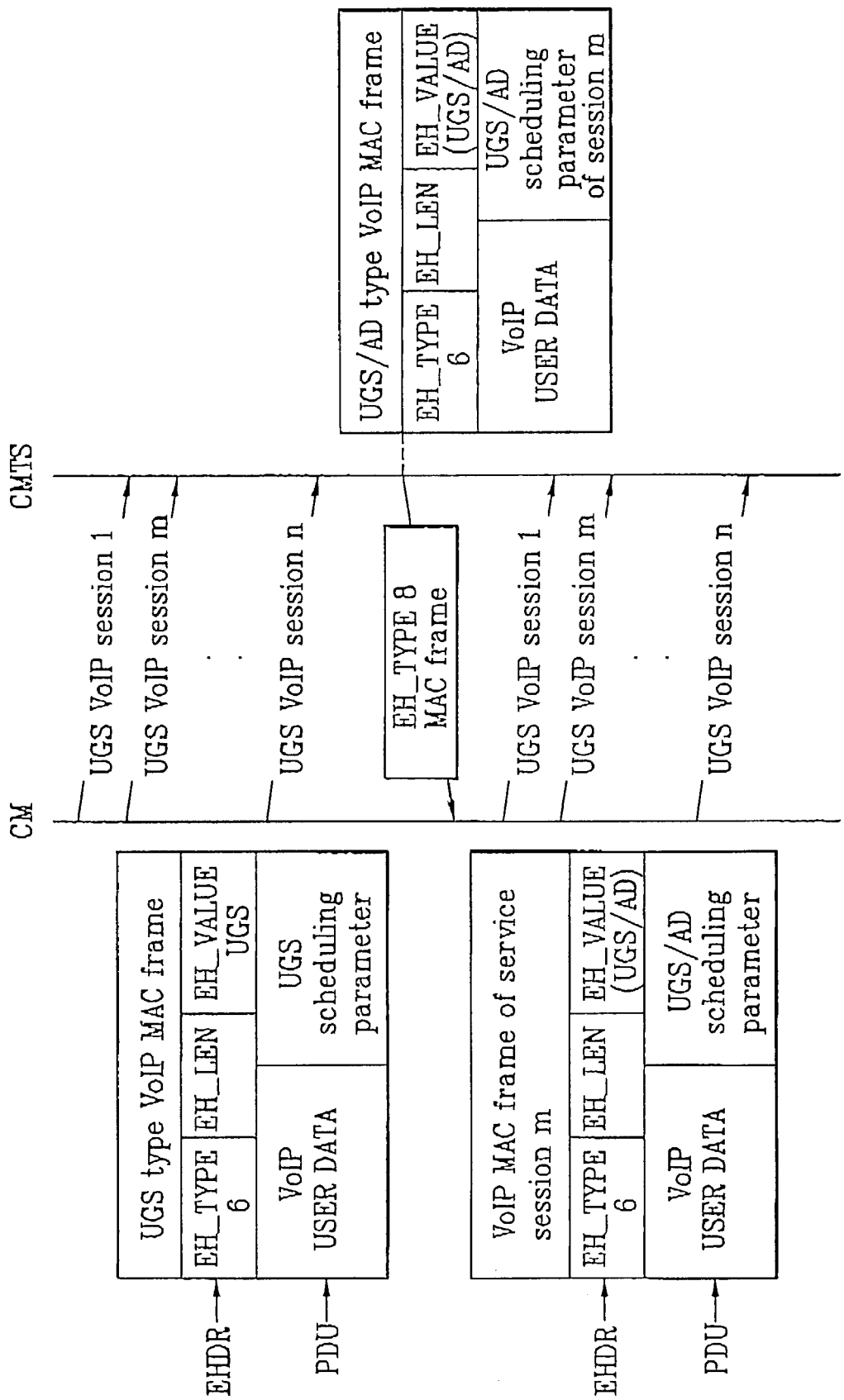
FIG. 6 illustrates a scheduling switch procedure according to one embodiment of the present invention.

FIG. 6 illustrates a scheduling switch procedure according to one embodiment of the present invention, in which a scheduling type of a specific one m of n VoIP service sessions set to the UGS type as the scheduling type is switched to the UGS/AD type.

The scheduling type of the entire VoIP service sessions including the VoIP service session m sharing the single physical channel currently is set to the UGS type. Accordingly, the value EH_VALUE=>UGS representing the UGS type is set to the sixth type of sixteen types EH_TYPE in the extended header field of the MAC frame format.

And, a general VoIP user data USER DATA a scheduling parameter used for the UGS type are inserted in the user data field USER DATA or the payload data unit PDU.

First of all, the CM transmits a VoIP service MAC frame to the CMTS to let the entire service sessions use the allocated time slots.

In this case, in order to switch the scheduling type for the $m^{th}$ VoIP session to the UGS/AD type, the CMTS sets the value EH_VALUE=>UGS/AD representing the switch to the $8^{th}$ type of the sixteen types EH_TYPE of the extended header field and inserts the scheduling parameter to be used additionally for the UGS/AD type and the VoIP user data USER DATA in the user data field of the payload data unit. Moreover, in order to distinguish the $m^{th}$ VoIP session of which scheduling type will be switched from other VoIP sessions scheduled into the UGS type, the CMTS inserts IP addresses (source and destination addresses) of the $m^{th}$ VoIP session in the user data field together with the scheduling parameters.

Namely, the scheduling parameters required for the switch to the UGS/AD type such as the "Nominal Polling Interval" representing the polling interval and the "Tolerated Poll Jitter" representing the polling delay allowing range are inserted together with the IP addresses (source and destination addresses) of the $m^{th}$ VoIP session.

Thus, once the MAC frame for switching the scheduling to the UGS/AD type is constructed, the CMTS transmits the MAC frame to the CM.

The CM having received the MAC frame checks whether the scheduling type for the $m^{th}$ VoIP session can be switched or not based on the information inserted in the received MAC frame. More specifically, the CM checks whether the $m^{th}$ VoIP session is in the inactive state transmitting the invalid voice packets or not.

If it is judged that the $m^{th}$ VoIP session occupies the time slot inactively to enable the switch of the scheduling type, the CM sets the value EH_VALUE=>UGS/AD representing the UGS/AD type to the $8^{th}$ type of the extended header field and then transmits the VoIP MAC frame to the CMTS.

On the other hand, if it is judged that the switch of the scheduling type is impossible, the CM transmits the VoIP MAC frame set as the value EH_VALUE=>UGS representing the UGS type to the $6^{th}$ type of the extended header field to the CMTS.

In this case, the CMTS monitors the type EH_TYPE set to the extended header field of the $m^{th}$ VoIP session for a predetermined time. Yet, if the $8^{th}$ extended header type is not set to the extended header field of the received MAC frame, the CMTS periodically repeats to transmit the MAC frame constructed to switch the scheduling to the UGS/AD type. In this case, the CMTS repeats the transmission until the value EH_VALUE=>UGS/AD representing the UGS/AD type is set to the $8^{th}$ type of the extended header field EHDR in the received MAC frame Accordingly, in providing the VoIP service for transmitting the variable-length packets, the method of controlling the MACs between the cable modem termination system CMTS and the cable modem CM according to the present invention individually switches only the scheduling type of the service session occupying the source (time slot) inactively among a plurality of the service sessions sharing the single physical channel, thereby enabling to reduce the waste of the unnecessary bandwidth.

Moreover, the present invention switches the scheduling type of the service session raising the waste of source only instead of switching the scheduling type of the entire service sessions sharing the single physical channel, thereby enabling to improve overall quality of service (QoS).

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of controlling MACs (media access controls) between a cable modem termination system (CMTS) and a cable modem (CM), comprising:
   a first step of monitoring a scheduling state of a plurality of service sessions sharing a physical channel between the CMTS and CM; and
   a second step of switching a scheduling type of a specific session occupying the physical channel inactively among a plurality of the service sessions sharing the physical channel,
   wherein the second step includes a step of inserting a source address and a destination address for distinguishing the specific service session, of which scheduling type is to be switched, in a MAC frame format;
   further wherein the second step comprises: a step (a) of, when a time slot to be allocated to at least one additional service session added to share the physical channel is not available, having the CMTS insert a switch command of the scheduling type of the specific service session occupying the physical channel inactively in a MAC frame format to transmit to the CM; and a step (b) of having the CM switch the scheduling type of the specific service session occupying the physical channel in accordance with the switch command inserted in the MAC frame format; and
   a step after step (a), having the CM judge whether the scheduling type for a designated service session can be switched based on an insertion information of the MAC frame format received from the CMTS, and a step after step (a), having the CM transmit an affirmative response that the scheduling type of the designated service session can be switched to the CMTS.

2. The method of claim 1, wherein the CMTS further monitors a current scheduling type of a plurality of the service sessions sharing the physical channel, whether at least one additional service session to share the physical channel is added or not, and whether a time slot to be allocated to the additional service session to share the physical channel exists or not in the first step.

3. The method of claim 1, the step (a) comprising the steps of:
inserting the switch command of the scheduling type in an extended header field of a MAC header constructing the MAC frame format of the specific service session occupying the physical channel inactively;
inserting a source address and a destination address for distinguishing the specific service session, of which scheduling type will be switched, in a user data field (User Data) of a payload data unit (PDU) constructing the MAC frame format; and
encoding the MAC frame format of the specific service session, of which scheduling type will be switched, to transmit to the CM.

4. The method of claim 3, wherein the switch command of the scheduling type is inserted in an area of the extended header field by the step of inserting the switch command of the scheduling type.

5. The method of claim 4, wherein the switch command of the scheduling type uses extended_header_type (EH_TYPE) as the area defined in the extended header field and a command value of the switched scheduling type is inserted in an area of an extended_header_value (EH_VALUE) according to the used type.

6. The method of claim 5, wherein, when a first scheduling type allocating the time slot to the service sessions sharing the physical channel is used regardless of a channel occupying state, the command value for switching the first scheduling type to a second scheduling type allocating the time slot allocated to the specific service session occupying the physical channel inactively among the service sessions sharing the physical channel is inserted in the area of the extended_header_value (EH_VALUE).

7. The method of claim 6, wherein a command value for returning the switched second scheduling type to the first scheduling type is inserted in the area of the extended_header_value (EH_VALUE).

8. The method of claim 5, wherein the command value for switching from an unsolicited grant service (UGS) type to an unsolicited grant service/activity detection (UGS/AD) type is inserted in the area of the extended_header_value (EH_VALUE) in the extended_header_type (EH_TYPE) used for the switch command and the command value for switching the UGS/AD type to the UGS type is inserted in the area type of the extended_header_value (EH_VALUE) in the used extended_header_type (EH_TYPE).

9. The method of claim 4, wherein the switch command of the scheduling type uses an extended_header_type (EH_TYPE) defined in the extended heard field, a command value for switching from an unsolicited grant service (UGS) type to an unsolicited grant service/activity detection (UGS/AD) type is inserted in the area of the extended_header_value (EH_VALUE) in the extended header type (EH_TYPE), and a command value for switching from the UGS/AD type to the UGS type is inserted in the area of the extended_header_value (EH_VALUE) in the extended header type (EH_TYPE).

10. The method of claim 1, wherein, in the step (a), the CMTS periodically repeats to transmit the MAC frame format having the switch command of the scheduling type for the specific service session until a response is received from the CM.

11. The method of claim 1, wherein the step of having the CM judge whether the scheduling type for a designated service session can be switched is carried out in accordance with a result of checking whether the designated service session occupies the time slot inactively or not as a source address and a destination address are inserted in a user data field (User Data) constructing a payload data unit of the MAC frame format to receive.

12. The method of claim 1, wherein, when a voice over internet protocol (VoIP) service transmitting variable-length packets is scheduled by an unsolicited grant service (UGS), the MACs are controlled in a manner that sessions of the VoIP service are partially scheduled by an unsolicited grant service with activity detection (UGS/AD) type.

13. In controlling MACs (media access controls) between a cable modem termination system (CMTS) and a cable modem (CM) supporting a voice over internet protocol (VoIP) service, a method of controlling the MACs (media access controls) between the cable modem termination system (CMTS) and the cable modem (CM), comprising:
a first step of having the CMTS monitor a scheduling state of a plurality of IPs sharing a physical channel between the CMTS and CM; and
a second step of having the CM switch a scheduling type of the IP occupying a time slot inactively among a plurality of the IPs,
wherein the second step includes a step of inserting a source address and a destination address for distinguishing the specific service session, of which scheduling type is to be switched, in a MAC frame format;
further wherein the second step comprises: a step (a) of, when the time slot to be allocated to at least one additional IP added to share the physical channel is not available, having the CMTS insert a switch command of the scheduling type of the specific IP of an inactive state in a MAC frame format transmitted to the IP of the inactive state to transmit to the CM; and a step (b) of having the CM switch the scheduling type of the specific IP of the inactive state in accordance with the switch command inserted in the MAC frame format, and
wherein the step (b) switches the scheduling type applied to the IP of the inactive state to a first scheduling type allocate the time slot only to the IPs of the active state occupying the time slot actively.

14. The method of claim 13, wherein, in the first step, the CMTS monitors the current scheduling type of the prior IPs sharing the physical channel, whether a new IP to share the physical channel exists, and whether a time slot to be allocated to the new IP exists.

15. The method of claim 13, the step (a) comprising the steps of:
inserting the switch command of the scheduling type for the IP of the inactive state in an extended header field of a MAC header on the MAC frame format;
inserting a source address and a destination address for distinguishing the IP, of which scheduling type will be switched, in a user data field (User Data) of a payload data unit (PDU) in the MAC frame format; and
encoding the MAC frame format to transmit to the CM.

16. The method of claim 15, wherein the step of inserting the addresses in the user data field further inserts a scheduling parameter to be used for a scheduling switch in the user data field (User Data) of the payload data unit (PDU).

17. The method of claim 16, wherein, by comparing a currently operating scheduling type and a switch-expecting scheduling type to each other, parameters, which are different from parameters used for the currently operating scheduling type and are used for the switch-expecting scheduling type, are further inserted in the user data field (User Data) of the payload data unit (PDU).

18. The method of claim 13, wherein, in the step (a), the CMTS periodically repeats to transmit the MAC frame format having the inserted switch command of the scheduling type for the specific IP until a response is received from the CM.

19. The method of claim 13, after the step (b), further comprising a step of, as a degree that the IPs sharing the physical channel occupy the time slot is mitigated, switching the first scheduling type applied to the IP of the inactive state to a second scheduling type allocating the time slot thereto regardless of whether the IP of the inactive state occupies the time slot actively or not.

20. In controlling MACs (media access controls) between a cable modem termination system (CMTS) and a cable modem (CM) supporting variable- length packet transmission, a method of controlling the MACs (media access controls) between the cable modem termination system (CMTS) and the cable modem (CM), comprising:

a first step of having the CMTS monitor a time slot occupying state of a plurality of service sessions sharing a physical channel formed between the CMTS and CM for the variable-length packet transmission;

a second step of, as an additional service session to share the physical channel is added, having the CMTS command the CM to switch a scheduling type of a specific service session occupying the time slot inactively among a plurality of the service sessions sharing the physical channel; and a third step of having the CM switch the current scheduling type of the specific service session occupying the time slot inactively to another scheduling type, wherein the second step includes a step of inserting a source address and a destination address for distinguishing the specific service session, of which scheduling type is to be switched, in a MAC frame format; and wherein, in order for the CMTS to switch the prior scheduling type for the specific service session occupying the time slot inactively, a switch command of the scheduling type, IP addresses of the service session expecting a switch of the scheduling type, and parameters required for the switch of the scheduling type are inserted in a MAC frame format of the specific service session occupying the time slot inactively to transmit to the CM.

21. The method of claim 20, wherein, by comparing a currently operating prior scheduling type and a switch-expecting new scheduling type to each other, parameters, which are different from parameters used for the prior scheduling type and are used for the new scheduling type, are further inserted in a user data field (User Data) constructing a payload data unit (PDU) of the MAC frame format.

22. The method of claim 20, wherein the switch command of the scheduling type having a form of type/length/value (TYPE/LEN/VALUE) is inserted in an extended header field of the MAC frame format of the service session having the scheduling type to be switched.

23. The method of claim 20, wherein, in order to switch the scheduling type by each of the service sessions, a destination IP address and a source IP address of the service session having the scheduling type to be switched are inserted in a user data field (User Data) constructing a payload data unit (PDU) of the MAC frame format of the service session having the scheduling type to be switched.

24. The method of claim 20, wherein the scheduling type is switched between a UGS (unsolicited grant service) type allocating the time slot to the service sessions sharing the physical channel regardless of whether to occupy the time slot or not and a UGS/AD (unsolicited grant service with activity detection) type suppressing the time slot allocated to the specific service session occupying the time slot inactively among a plurality of the service sessions sharing the physical channel to allocate to another service session.

* * * * *